US012618389B2

(12) United States Patent
Maekawa

(10) Patent No.:  US 12,618,389 B2
(45) Date of Patent:       May 5, 2026

(54) VEHICLE CONTROL METHOD AND VEHICLE CONTROL DEVICE

(71) Applicant: NISSAN MOTOR CO., LTD., Yokohama (JP)

(72) Inventor: Takuya Maekawa, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 153 days.

(21) Appl. No.: 18/598,990

(22) Filed: Mar. 7, 2024

(65) Prior Publication Data

US 2024/0301851 A1      Sep. 12, 2024

(30) Foreign Application Priority Data

Mar. 9, 2023    (JP) .................................. 2023-036845

(51) Int. Cl.
*F02N 11/08*           (2006.01)
*B60Q 9/00*            (2006.01)

(52) U.S. Cl.
CPC ............ *F02N 11/0825* (2013.01); *B60Q 9/00* (2013.01); *F02N 11/0833* (2013.01); *F02N 2200/0801* (2013.01); *F02N 2200/0802* (2013.01)

(58) Field of Classification Search
None
See application file for complete search history.

(56) References Cited

U.S. PATENT DOCUMENTS

2005/0199209 A1*  9/2005  Shimokawa ........ F02N 11/0822
                                                          123/198 DB
2014/0081561 A1*  3/2014  Be ...................... B60W 50/085
                                                          701/112
2017/0356415 A1*  12/2017  Khafagy ............... B60W 10/06

FOREIGN PATENT DOCUMENTS

JP        2000-097065 A        4/2000
JP        2000179389 A    *   6/2000
JP        2014185549 A    *   10/2014
WO      WO-2013137038 A1 *   9/2013   .......... F02N 11/0822

* cited by examiner

*Primary Examiner* — Christian Chace
*Assistant Examiner* — Shayne M. Gilbertson
(74) *Attorney, Agent, or Firm* — Foley & Lardner LLP

(57)                ABSTRACT

The present invention is applied to a control device for controlling a vehicle that travels using a driving force of an engine. The control device for the vehicle includes the vehicle speed detection unit that detects the vehicle speed, and the automatic engine stop unit that performs the automatic engine stop after a prescribed time elapses from when the vehicle speed detection unit detects that the vehicle is in the stopped state. When a failure of the vehicle speed detection unit is detected, the automatic engine stop by the automatic engine stop unit is prohibited.

15 Claims, 6 Drawing Sheets

24

241

NOTIFICATION UNIT

DISPLAY DEVICE

VEHICLE DOESN'T AUTOMATICALLY
SHUT OFF

VEHICLE CONTROL METHOD AND VEHICLE CONTROL DEVICE

FIELD OF THE INVENTION

The present invention relates to a vehicle control method and a vehicle control device.

BACKGROUND OF THE INVENTION

JP 2000-97065 A discloses an engine idling stop device that issues an engine stop warning in advance and then stops an engine in a case where a vehicle driven by the engine idles for a predetermined time or more when the vehicle is in a stopped state.

SUMMARY OF THE INVENTION

In the engine idling stop device disclosed in JP 2000-97065 A, the device determines that the vehicle is in the stopped state using a vehicle speed sensor that detects a vehicle speed. Therefore, if the vehicle speed sensor fails, the vehicle speed sensor may not be able to correctly determine the stopped state, and the engine may automatically stop even when the vehicle is not in the stopped state.

An object of the present invention is to provide a vehicle control method and control device in which automatic stop of the engine can be prevented when the vehicle is not in a stopped state.

An aspect of the present invention is applied to a vehicle control device for controlling a vehicle that travels using a driving force of an engine by being mounted on the vehicle. The vehicle control device includes a vehicle speed detection unit that detects a vehicle speed, and an automatic engine stop unit that performs automatic engine stop after a prescribed time elapses from when the vehicle speed detection unit detects that the vehicle is in a stopped state. When a failure of the vehicle speed detection unit is detected, the automatic engine stop by the automatic engine stop unit is prohibited.

DESCRIPTION OF THE EMBODIMENTS

Figure 1:
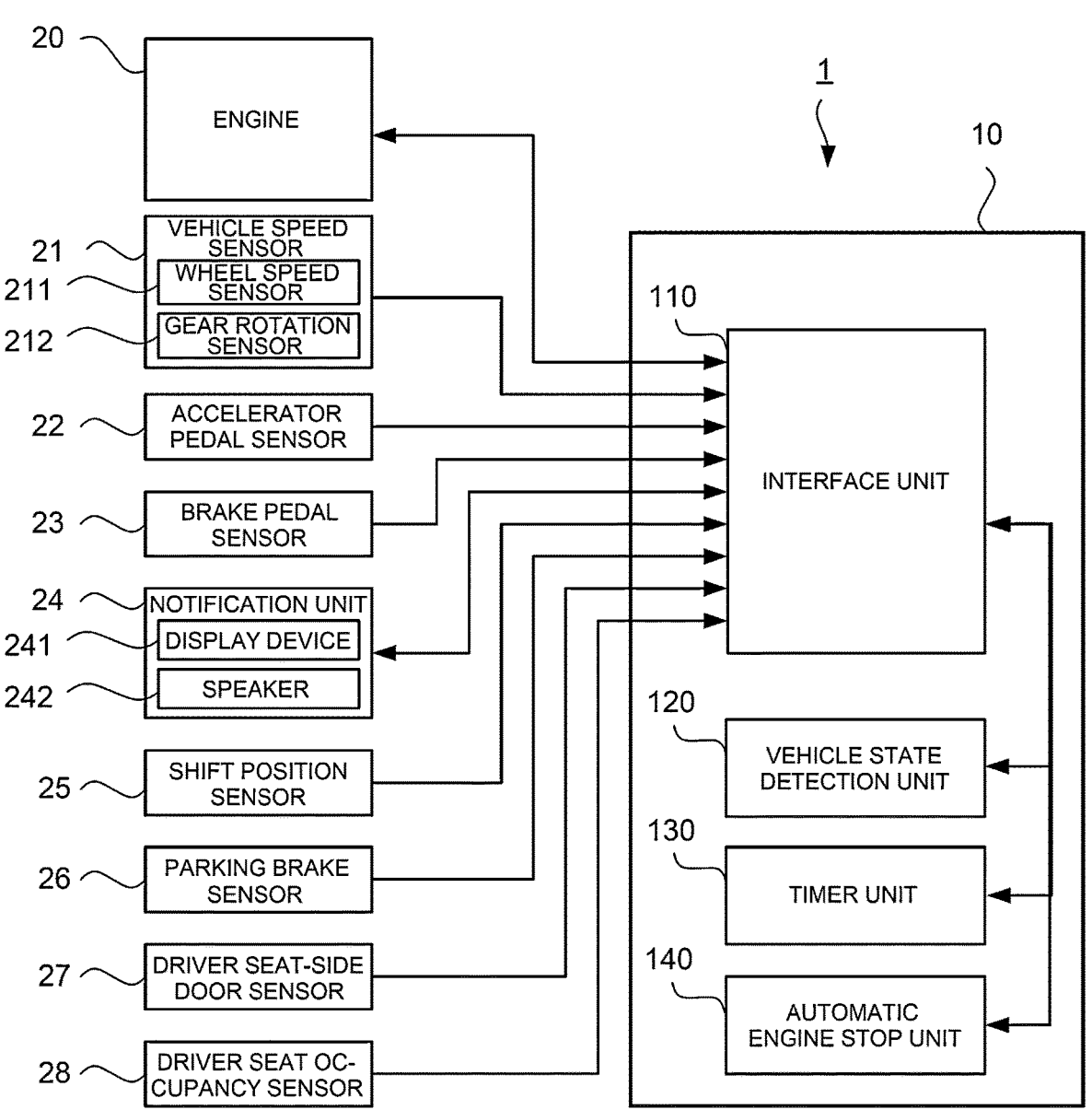
FIG. 1 is a block diagram of a configuration of a control device for a vehicle according to the present embodiment.

Hereinafter, embodiments of the present invention will be described with reference to the accompanying drawings.
FIG. 1 is an explanatory diagram of a control device 10 for a vehicle 1 according to an embodiment of the present invention.
The control device 10 is mounted on the vehicle 1 and controls the operation of an internal combustion engine 20 that drives the vehicle 1. The engine 20 drives the vehicle 1 by rotating wheels via a speed reducer or transmission (not shown). As will be described later, the control device 10 executes automatic engine stop that automatically stops (shuts off) the engine 20.

The vehicle 1 is not limited to the configuration in which the wheels are driven by the rotation of the engine 20, and may be configured to travel by driving a generator by the rotation of the engine 20 and driving a motor by the electric power generated by the generator.

Figure 2:
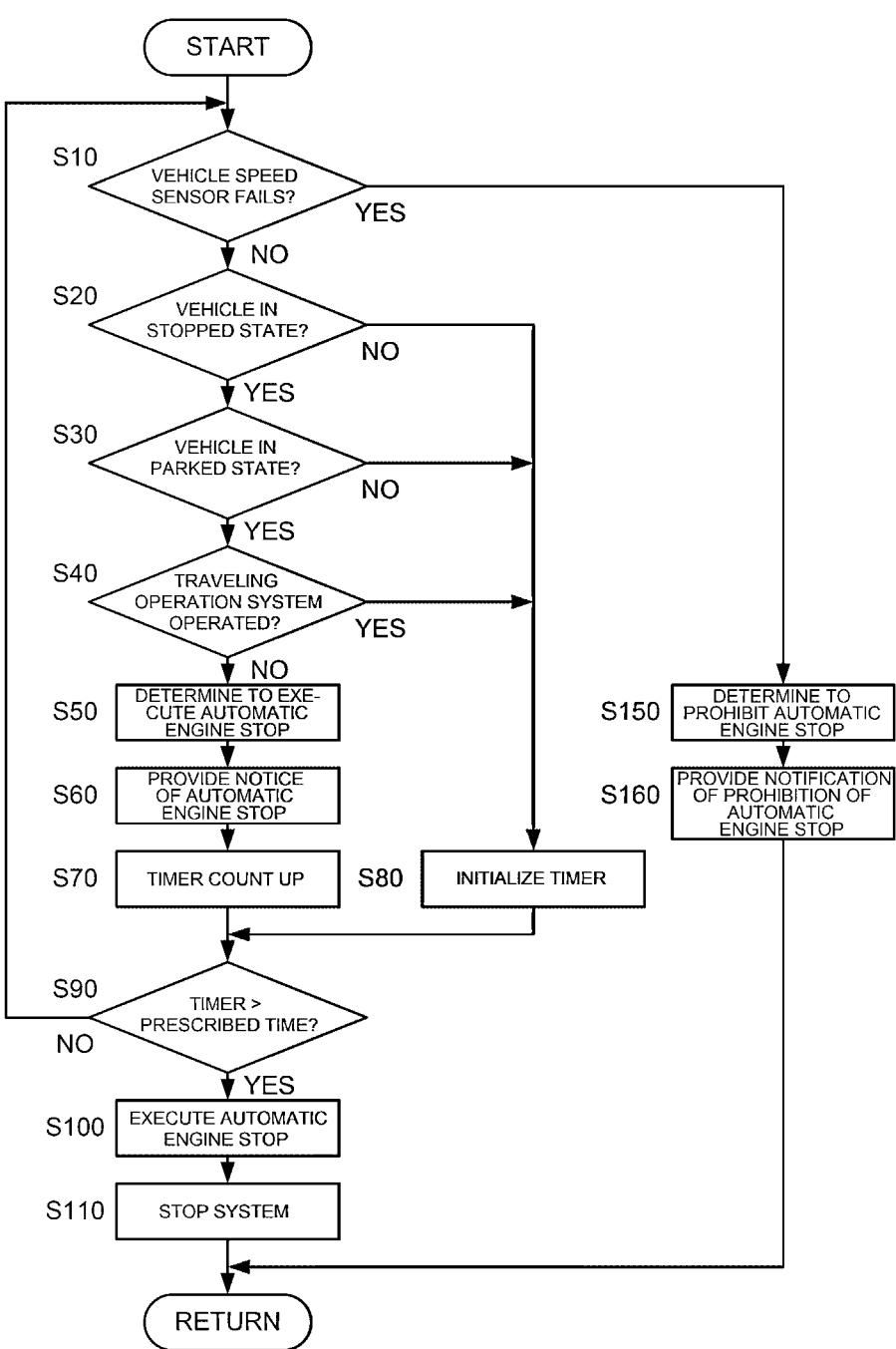
FIG. 2 is a flowchart of a process performed by the control device.

The control device 10 includes an interface unit 110, a vehicle state detection unit 120, a timer unit 130, and an automatic engine stop unit 140. The control device 10 includes a controller (not shown). The controller stores a program in advance. When the controller executes the program, the operations of the units of the control device 10 and the control shown in FIG. 2 are implemented.

The interface unit 110 receives signals transmitted from various sensors, switches and the like provided in the vehicle 1. The received signals are transmitted to the vehicle state detection unit 120. As will be described later, the interface unit 110 transmits a signal to the engine 20 to automatically stop the engine 20. In addition, the interface unit 110 causes the notification unit 24 to provide a notification that the automatic engine stop will be executed and a notification that the automatic engine stop will be prohibited.

The interface unit 110 receives signals from a vehicle speed sensor 21, an accelerator pedal sensor 22, a brake pedal sensor 23, a shift position sensor 25, a parking brake sensor 26, a driver seat-side door sensor 27 and a driver seat occupancy sensor 28.

The vehicle speed sensor 21 includes a wheel speed sensor 211 that detects a rotation speed of a wheel and a gear rotation sensor 212 that detects the rotation of a gear of the transmission.

The accelerator pedal sensor 22 detects ON/OFF and accelerator opening (accelerator pedal depression amount) of an accelerator pedal operated by a driver.

The brake pedal sensor 23 detects ON/OFF and a brake pedal depression amount of a brake pedal operated by the driver.

The shift position sensor 25 detects a shift position of a shift lever operated by the driver.

The parking brake sensor 26 detects ON/OFF and a brake depression amount of a parking brake operated by the driver.

The driver seat-side door sensor 27 detects opening and closing of a driver seat-side door operated by the driver.

The driver seat occupancy sensor 28 detects an occupancy state of the driver in a driver seat, that is, whether the driver is seated (ON) or not seated (OFF).

The notification unit 24 includes a display device 241 such as a display that displays video, and a speaker 242 that emits sound.

The signals from the various sensors received by the interface unit 110 are sent to the vehicle state detection unit 120. The vehicle state detection unit 120 detects a state of the vehicle 1, that is, whether the vehicle 1 is in a stopped state or a parked state, based on the signals of the various sensors sent from the interface unit 110.

The stopped state of the vehicle 1 is detected based on a signal from the vehicle speed sensor 21. The vehicle state detection unit 120 detects that the vehicle 1 is in the stopped state when the vehicle speed is 0 [km/h] for a certain period of time (for example, 30 seconds) or more, based on signals from the wheel speed sensor 211 and the gear rotation sensor 212 of the vehicle speed sensor 21.

The parked state of the vehicle 1 is detected based on a signal from the shift position sensor 25. The vehicle state detection unit 120 detects that the vehicle 1 is in the parked state when the shift lever is in a parking state for a certain period of time (for example, 5 minutes) or more, based on the signal from the shift position sensor 25. Thus, a parked state detection unit is configured. In addition, instead of the signal from the shift position sensor 25, based on a signal from the parking brake sensor 26, the parked state of the vehicle 1 may be detected when the parking brake in the ON state for a certain period of time (for example, 5 minutes) or more.

When the vehicle state detection unit 120 detects that the vehicle 1 is in the stopped state or detects that the vehicle 1 is in the parked state, the vehicle state detection unit 120 sends a signal indicating the stopped state or the parked state to the automatic engine stop unit 140.

The automatic engine stop unit 140 executes the automatic engine stop. The automatic engine stop is a process of automatically stopping the engine 20 regardless of the operation of the driver when the vehicle state detection unit 120 detects that the parked state of the vehicle 1 is continued for a prescribed time (for example, 30 minutes) or more.

When the automatic engine stop unit 140 executes the automatic engine stop, the notification unit 24 notifies the driver of a notice that the automatic engine stop will be executed. The automatic engine stop unit 140 causes the display device 241 of the notification unit 24 to display a text message or image notice that the automatic engine stop will be executed after a prescribed time. At this time, an alarm sound may be emitted via the speaker 242 of the notification unit 24. In addition, immediately before (for example, 5 minutes before) the automatic engine stop is executed, a notice that the automatic engine stop will be executed soon is provided.

In this way, the control device 10 executes the automatic engine stop, thereby preventing an increase in a fuel consumption amount of the engine 20 and an increase in emissions due to the vehicle 1 being in the parked state for a long time.

Next, a case will be described in which a failure occurs in the vehicle speed sensor 21 in the control device 10 of the vehicle 1 configured as described above.

The vehicle state detection unit 120 acquires signals from the vehicle speed sensor 21 (the wheel speed sensor 211 and the gear rotation sensor 212), and normally detects whether the sensor fails.

When the vehicle state detection unit 120 detects that a signal from the wheel speed sensor 211 or the gear rotation sensor 212 is not normal, the vehicle state detection unit 120 detects a failure of the wheel speed sensor 211 or the gear rotation sensor 212. A failure is detected when a signal is outside a specified range (for example, 0 [km/h] to 300 [km/h]) for a prescribed time (for example, 1 minute) or more due to a failure of the wheel speed sensor 211 or the gear rotation sensor 212, a disconnection or a short circuit of a signal line, or the like.

When the vehicle state detection unit 120 detects a failure of one of the wheel speed sensor 211 and the gear rotation sensor 212 fails, the vehicle state detection unit 120 can detect the vehicle speed based on a signal from the other sensor in which no failure is detected.

On the other hand, when the vehicle state detection unit 120 detects a failure of both the wheel speed sensor 211 and the gear rotation sensor 212, the vehicle state detection unit 120 cannot detect the vehicle speed of the vehicle 1, and cannot detect whether the vehicle 1 is in the stopped state. In such a state, it is not preferable to execute the automatic engine stop.

When the automatic engine stop unit 140 determines that the vehicle state detection unit 120 cannot detect the vehicle speed and cannot detect whether the vehicle is in the stopped state, the automatic engine stop unit 140 prohibits the automatic engine stop so that the automatic engine stop is not executed.

In a case where the automatic engine stop unit 140 prohibits the automatic engine stop and the driver does not notice this, the driver may think that the automatic engine stop will be executed as usual and may leave the vehicle 1. In this case, since the automatic engine stop is not executed, the engine 20 continues to operate, resulting in problems such as increases in the fuel consumption amount and emissions.

Therefore, in the present embodiment, the problems such as increases in the fuel consumption amount and emissions are prevented by the following configuration.

FIG. 2 is a flowchart of an automatic engine stop process executed by the control device 10 of the present embodiment. This flowchart is executed at prescribed intervals in the control device 10.

First, in step S10, the vehicle state detection unit 120 determines whether the vehicle speed sensor 21 fails. Whether the vehicle speed sensor 21 fails is determined based on whether a failure of both the wheel speed sensor 211 and the gear rotation sensor 212 is detected as described above.

When no failure of the vehicle speed sensor 21 is detected, the process proceeds to step S20. When a failure of the vehicle speed sensor 21 is detected, the process proceeds to step S150.

In step S20, the vehicle state detection unit 120 determines whether the vehicle 1 is in the stopped state. Whether the vehicle 1 is in the stopped state is determined based on the signal from the vehicle speed sensor 21 as described above. When the vehicle 1 is determined to be in the stopped state, the process proceeds to step S30. When the vehicle 1 is determined not in the stopped state, the process proceeds to step S80.

In step S30, the vehicle state detection unit 120 determines whether the vehicle 1 is in the parked state. Whether the vehicle 1 is in the parked state is determined based on the signal from the shift position sensor 25 as described above. When the vehicle 1 is determined to be in the parked state, the process proceeds to step S40. When the vehicle 1 is determined not in the parked state, the process proceeds to step S80.

In step S40, the vehicle state detection unit 120 determines whether a traveling operation device is operated. The traveling operation device includes the accelerator pedal and the brake pedal. When the driver operates the traveling operation device, it is estimated that the driver intends to drive the vehicle 1, and the parked state is determined to be interrupted.

The vehicle state detection unit 120 determines that the traveling operation device is operated based on a signal from the accelerator pedal sensor 22 and a signal from the brake pedal sensor 23. When the traveling operation device is not operated, the vehicle 1 is determined to remain in the parked state, and the process proceeds to step S50. When the traveling operation device is operated, the parked state of the vehicle 1 is determined to be interrupted, and the process proceeds to step S80.

In step S50, the automatic engine stop unit 140 determines that the vehicle 1 is in the parked state based on the results of steps S10 to S40, and determines to execute the automatic engine stop.

Next, in step S60, the automatic engine stop unit 140 causes the notification unit 24 to provide a notice that the automatic engine stop will be executed after a prescribed time (30 minutes).

Next, in step S70, the automatic engine stop unit 140 counts up a timer value set in the timer unit 130. The timer value is a value used to determine whether a prescribed time elapses, and an initial value is set to zero and is counted up every second.

Next, in step S90, the automatic engine stop unit 140 determines whether a current timer value indicates that the prescribed time elapses. When the timer value is less than the prescribed time, the process returns to step S10. When the timer value indicates that the prescribed time elapses, the process proceeds to step S100.

In step S100, the automatic engine stop unit 140 executes the automatic engine stop process. Specifically, prior to the automatic engine stop, the automatic engine stop unit 140 first causes the notification unit 24 to provide a notice that the automatic engine stop will be executed soon. Thereafter, an engine stop signal is transmitted to the interface unit 110 to stop the engine 20.

Next, in step S110, the automatic engine stop unit 140 executes system stop of the vehicle 1. As a result, the vehicle 1 enters a system stopped state (power off). Thereafter, the process of the present flowchart is ended, and the process returns to other processes.

When the vehicle 1 is determined not in the stopped state in step S20, when the vehicle 1 is determined not in the stopped state in step S30, or when the traveling operation device is operated and the parked state is interrupted, the process proceeds to step S80. In step S80, the timer value is initialized to zero, and the process proceeds to step S90.

When a failure of the vehicle speed sensor 21 is determined in step S10, the process proceeds to step S150. In step S150, the automatic engine stop unit 140 determines to prohibit the automatic engine stop. Then, the process proceeds to step S160, and the automatic engine stop unit 140 causes the notification unit 24 to provide a notification that the automatic engine stop is prohibited. Thereafter, the process of the present flowchart is ended, and the process returns to other processes.

As described above, in a case where the control device 10 executes the process of the flowchart shown in FIG. 2, when the vehicle 1 enters the parked state after the stopped state and the traveling operation device is not operated, the execution of the automatic engine stop is determined. On the other hand, when a failure of the vehicle speed sensor 21 is detected, the automatic engine stop is prohibited.

Figure 3:
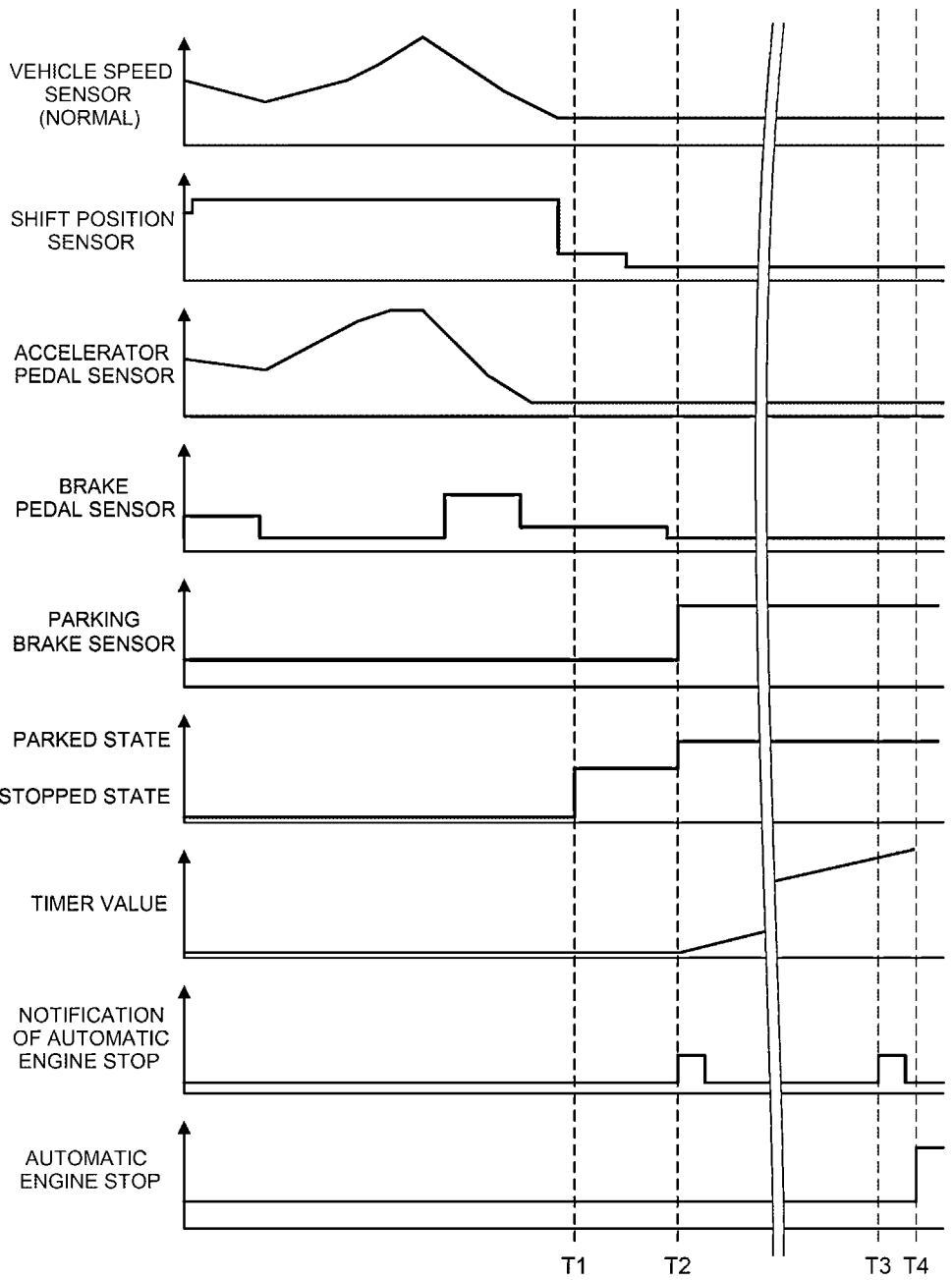
FIG. 3 is a time chart of the process performed by the control device.

FIG. 3 is a time chart of the automatic engine stop process executed by the control device 10 of the present embodiment.

In FIG. 3, the vehicle speed detected by the vehicle speed sensor 21, the shift position detected by the shift position sensor 25, the accelerator opening detected by the accelerator pedal sensor 22, a brake pedal depression amount detected by the brake pedal sensor 23, and the state of the parking brake detected by the parking brake sensor 26 are each shown on a time axis.

Further, whether the vehicle 1 is in the stopped state or the parked state, the timer value, the notification of the automatic engine stop, and execution timing of the automatic engine stop, which are detected by the control device 10, are each shown on a time axis.

At timing T1, the control device 10 determines that the vehicle 1 is in the stopped state, based on the vehicle speed detected by the vehicle speed sensor 21.

Further, at timing T2, the control device 10 determines that the vehicle 1 enters the parked state after the stopped state, based on the shift position detected by the shift position sensor 25.

When the vehicle 1 is determined to enter the parked state after the stopped state, the control device 10 causes the notification unit 24 to provide a notice that the automatic engine stop will be executed after a prescribed time. At this time, the timer value starts counting up.

Figure 5A:
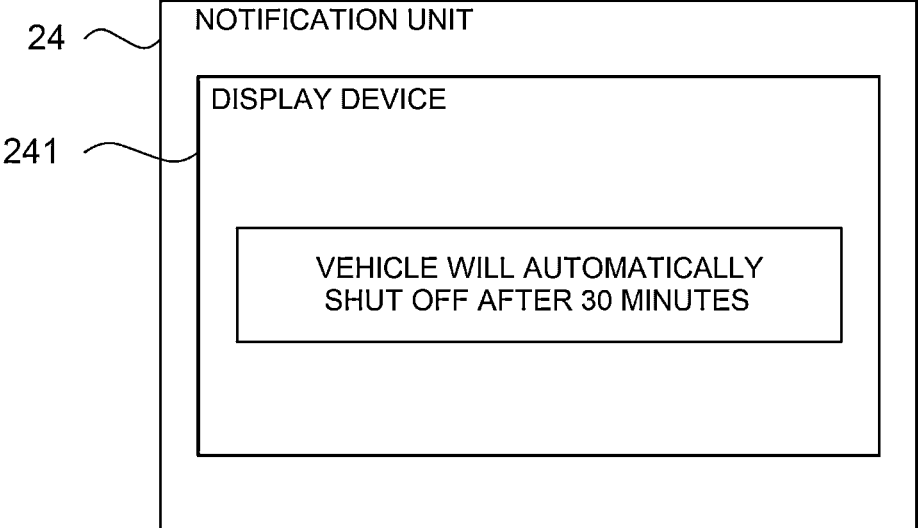
FIG. 5A is an explanatory diagram of an example of notification in a notification unit.

FIG. 5A is an explanatory diagram of an example of notification of a notice that the automatic engine stop will be executed, which is displayed on the display device 241 of the notification unit 24. As shown in FIG. 5A, the control device 10 causes the notification unit 24 to display a text message that the automatic engine stop will be executed after a prescribed time. At the same time, an alarm or sound may be emitted from the speaker 242.

Thereafter, at timing T3, immediately before (for example, 5 minutes before) the timer value (the prescribed time: 30 minutes) elapses, the control device 10 causes the notification unit 24 to provide a notice that the automatic engine stop will be executed soon.

At timing T4, when the timer value indicates that the prescribed time elapses, the control device 10 executes the automatic engine stop.

Figure 4:
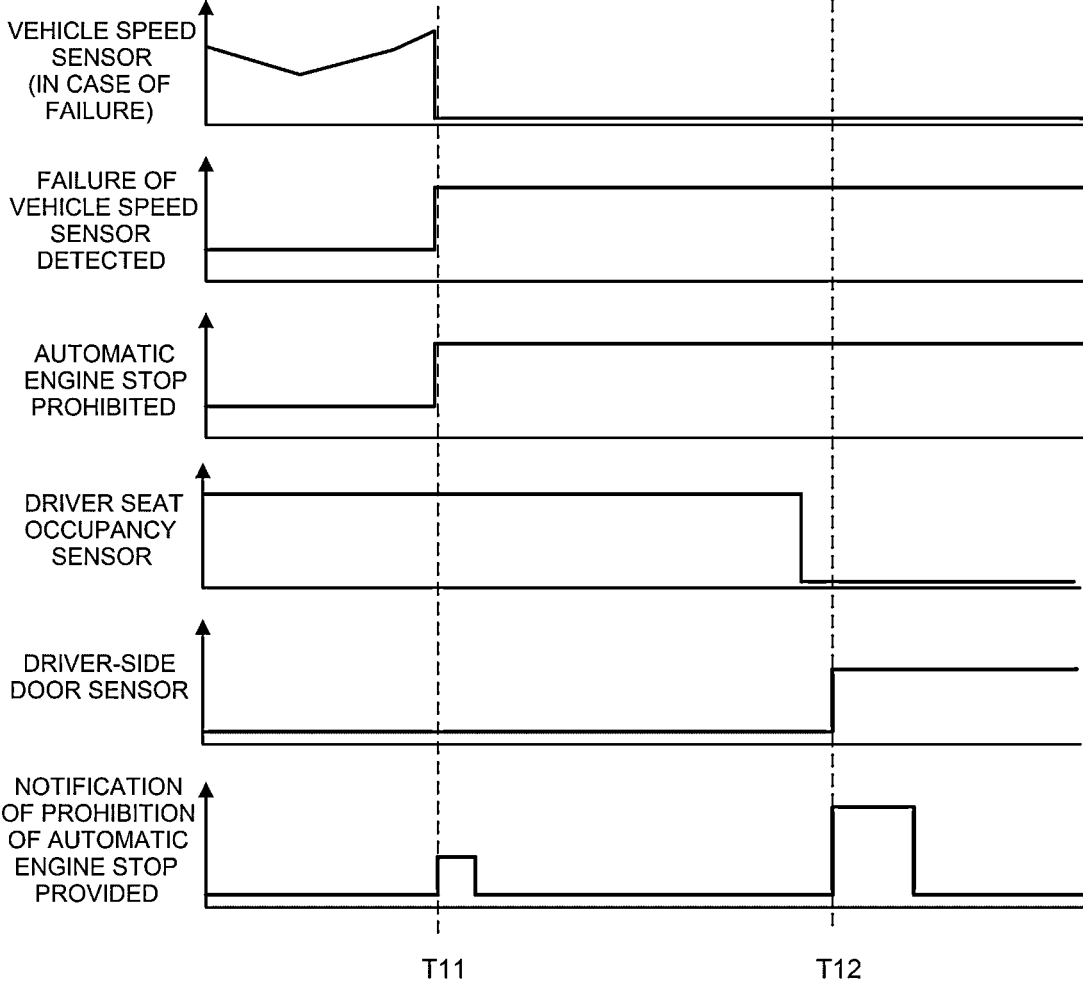
FIG. 4 is a time chart of the process performed by the control device.

FIG. 4 is a time chart of the automatic engine stop process executed by the control device 10 of the present embodiment, and is a time chart when a failure of the vehicle speed sensor 21 is detected.

In FIG. 4, the vehicle speed detected by the vehicle speed sensor 21, whether the vehicle speed sensor 21 fails, the prohibition state of the automatic engine stop, the occupancy state of the driver seat detected by the driver seat occupancy sensor 28, an open/closed state of the driver seat-side door detected by the driver seat-side door sensor 27, and the timing of the notification of the automatic engine stop are each shown on a time axis.

At timing T11, when both the wheel speed sensor 211 and the gear rotation sensor 212 fail and a failure of the vehicle speed sensor 21 is detected, the control device 10 determines to prohibit the automatic engine stop. Then, the control device 10 causes the notification unit 24 to provide a notification that the automatic engine stop is prohibited. The notification at this time is referred to as a "first notification mode.

Figure 5B:
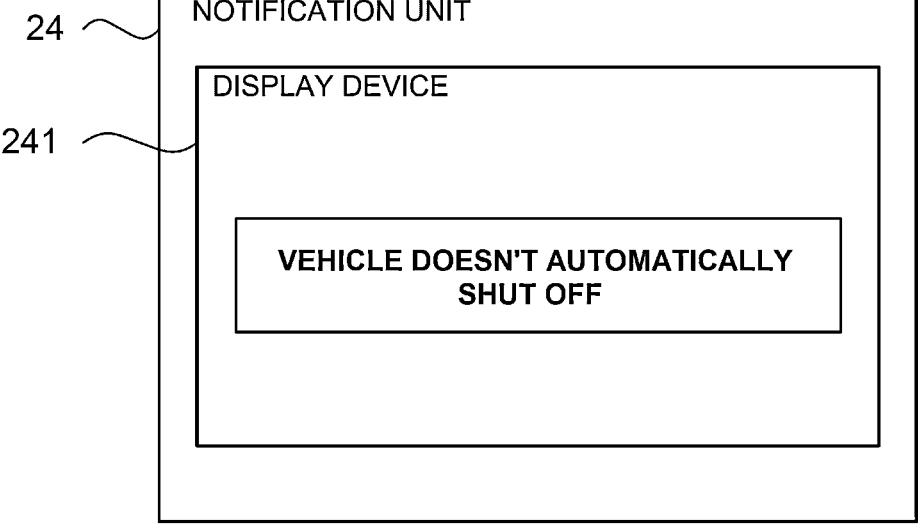
FIG. 5B is an explanatory diagram of an example of notification in the notification unit.

FIG. 5B is an explanatory diagram of an example of the notification that the automatic engine stop is prohibited, which is displayed on the display device 241 of the notification unit 24, and is an explanatory diagram showing the first notification mode.

As shown in FIG. 5B, the control device 10 causes the notification unit 24 to display a text message that the automatic engine stop is prohibited and that the automatic engine stop will not be performed. This message is set such that a size and color of characters are visually conspicuous compared to the notification of the notice that the automatic engine stop will be executed as shown in FIG. 5A. At the same time, a lamp indicating a failure of the vehicle speed sensor 21 may be displayed, or an alarm or sound may be emitted from the speaker 242.

Thereafter, when the control device 10 detects that the driver seat-side door is in the open state at timing T12, the control device 10 further causes the notification unit 24 to provide a notification that the automatic engine stop is prohibited. At this time, a notification having a notification mode different from the first notification mode before the door is opened is provided. This notification is referred to as a "second notification mode". In addition to the detection that the driver seat-side door is in the open state, the driver seat occupancy sensor 28 may detect that the driver is not seated.

Figure 5C:
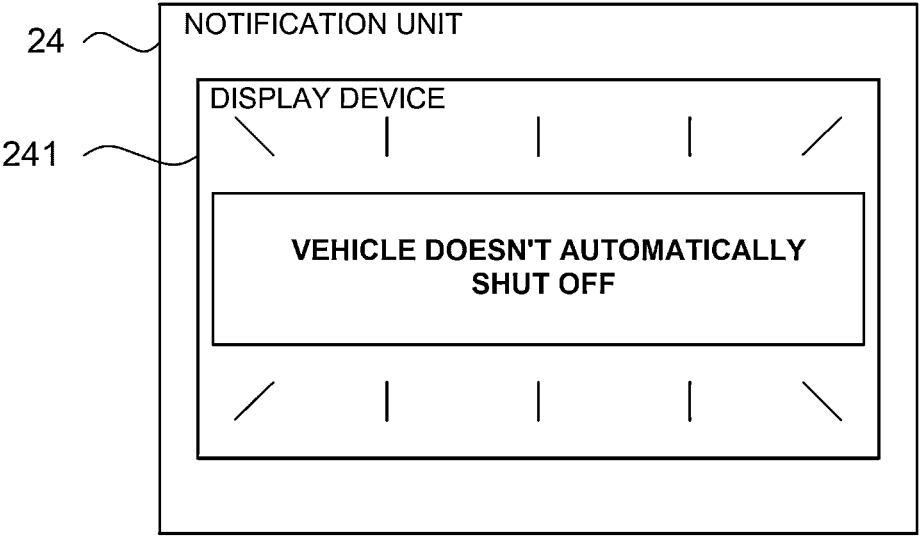
FIG. 5C is an explanatory diagram of an example of notification in the notification unit.

FIG. 5C is an explanatory diagram of an example of the notification that the automatic engine stop is prohibited, which is displayed on the display device 241 of the notification unit 24, and is an explanatory diagram showing the second notification mode.

As shown in FIG. 5C, the control device 10 causes the notification unit 24 to display a text message that the automatic engine stop is prohibited and the automatic engine stop will not be performed in the second notification mode. The second notification mode is displayed with a higher notification level than the first notification mode so that a character size is larger, a thickness and color of characters are more conspicuous, and the characters blink. At the same time, the alarm sound with a large volume level or high sound quality from the speaker 242 may be emitted in the second notification mode.

The control device 10 increases the notification level of the second notification mode compared to the first notification mode. The notification level is the degree of an alert of a notification given to the driver, and the higher the notification level, the more the driver is alerted.

More specifically, as the notification level increases, for example, the size and thickness of the characters displayed on the display device 241 are increased, the color is emphasized, and the characters are set to blink. Further, the volume level of the alarm sound emitted from the speaker 242 is increased, the sound quality of the alarm sound is switched to a higher sound quality, and the alarm sound is switched to a more tense sound.

As at the timing T12 in FIG. 4, when the driver leaves the driver seat and opens the driver seat-side door, it is estimated that the driver is leaving the vehicle 1 without turning off the power of the vehicle 1. In such a case, the notification that the automatic engine stop is prohibited is provided in the second notification mode in which the notification level is set higher than that in the first notification mode.

As described above, when the driver is leaving the vehicle 1 without turning off the power of the vehicle 1, the notification is provided in the second mode, so that it is possible to warn the driver against leaving the vehicle 1 thinking that the automatic engine stop will be executed as usual. As a result, it is possible to urge the driver to stop the engine 20 before leaving the vehicle 1, thereby preventing increases in the fuel consumption amount and emissions.

When a failure of the vehicle speed sensor 21 is detected after the notification of the notice that the automatic engine stop will be executed is provided at the timing T2 in FIG. 3, the notification that the automatic engine stop is prohibited is provided as shown at the timing T11 in FIG. 4. In such a case, at the same timing as the timing T3 in FIG. 3, that is, at the timing at which the notice that the automatic engine stop will be performed is provided, instead of the notification of the notice that the automatic engine stop will be performed, the notification that the automatic engine stop is prohibited may be sent.

In the second notification mode having a higher notification level than the first notification mode, the notification in the second notification mode may be repeatedly provided at a prescribed interval (for example, every 5 minutes) after the first notification is provided at the timing T11, in addition to the timing at which the driver opens a driver-side door, such as the timing T12 in FIG. 4. In this case, the second notification mode may be set such that the notification level gradually increases each time the notification is provided.

As described above, in the present embodiment, the control device 10 for a vehicle 1 for controlling the vehicle 1 that travels using a driving force of the engine 20 by being mounted on the vehicle 1 includes the vehicle speed sensor 21 serving as a vehicle speed detection unit that detects a vehicle speed, and the automatic engine stop unit 140 that performs automatic engine stop after a prescribed time elapses from when the vehicle 1 is determined to be in a stopped state based on a detection result of the vehicle speed sensor 21. When a failure of the vehicle speed sensor 21 is detected, the automatic engine stop by the automatic engine stop unit 140 is prohibited.

With this configuration, in a case where the automatic engine stop is performed, when a failure of the vehicle speed sensor 21 is detected, the automatic engine stop is prohibited. Thus, it is possible to prevent the engine 20 from automatically stopping in a situation where it is unclear whether the vehicle 1 is in the stopped state due to the failure of the vehicle speed sensor 21.

In the present embodiment, the notification unit 24 is provided to notify a driver, and when the automatic engine stop is prohibited, the notification unit 24 notifies the driver that the automatic engine stop will not be performed.

With this configuration, in order to prevent the driver from not noticing the prohibition of the automatic engine stop and leaving the vehicle 1 thinking that the automatic engine stop will be executed as usual, it is possible to notify the driver and urge the driver to stop the engine 20 before leaving the vehicle 1. Thus, increases in a fuel consumption amount and emissions can be prevented.

In the present embodiment, a parked state detection unit (the vehicle state detection unit 120) is provided to detect that the vehicle 1 is in a parked state, and when the vehicle 1 is in the parked state, the automatic engine stop is performed after a prescribed time from the detection. When a failure of the vehicle speed sensor 21 is detected, the automatic engine stop by the automatic engine stop unit 140 is prohibited regardless of whether the vehicle 1 is in the parked state.

With this configuration, when the vehicle speed sensor 21 fails, the engine 20 can be prevented from automatically stopping regardless of whether the vehicle 1 is in the parked state.

In the present embodiment, the notification unit 24 notifies that the automatic engine stop will be performed before a prescribed time for performing the automatic engine stop, and when a failure of the vehicle speed sensor 21 is detected, the notification unit 24 provides the notification that the automatic engine stop will not be performed instead of the notification that the automatic engine stop will be performed.

With this configuration, by providing the notification that the automatic engine stop will not be performed instead of providing the notification that the automatic engine stop will be performed, it is possible to reliably notify the driver that the automatic engine stop will not be performed.

In the present embodiment, a door opening and closing detection unit (the driver seat-side door sensor 27) is provided to detect the opening and closing of a driver-side door of the vehicle 1, and in a case where the automatic engine stop is prohibited, the notification unit 24 provides the notification that the automatic engine stop will not be performed when the driver-side door is detected to be opened.

With this configuration, by providing the notification at the timing when the driver opens the driver-side door, it is possible to prevent the driver from leaving the vehicle 1 without noticing the prohibition of the automatic engine stop.

In the present embodiment, in the case where the automatic engine stop is prohibited, the notification mode is changed before and after the driver-side door is opened. With this configuration, it is possible to reliably notify the driver that the automatic engine stop is prohibited before the driver leaves the vehicle 1.

In the present embodiment, in the case where the automatic engine stop is prohibited, the notification level of the notification mode after the driver-side door is opened is set to be higher than the notification level of the notification mode before the driver-side door is opened.

With this configuration, it is possible to prevent the driver from forgetting the notification that the automatic engine stop is prohibited and thinking that the automatic engine stop will be executed as usual, and leaving the vehicle 1.

In the present embodiment, the notification unit 24 is configured as the display device 241 provided forward a driver seat of the vehicle, and displays on the display device 241 the notification that the automatic engine stop will be performed and/or the notification that the automatic engine stop will not be performed.

With this configuration, it is possible to visually notify the driver that the automatic engine stop will not be performed.

In the present embodiment, the display device 241 displays the notification that the automatic engine stop will be performed and the notification that the automatic engine stop will not be performed in different modes.

With this configuration, it is possible to more clearly alert the driver that the automatic engine stop will not be performed, compared to a case where the automatic engine stop will be performed.

In the present embodiment, since the display device 241 displays a message that the automatic engine stop will not be performed, the driver can be informed through the message that the automatic engine stop will not be performed.

In the present embodiment, when performing the automatic engine stop, the notification unit 24 provides the notification that the automatic engine stop will be performed before a prescribed time for performing the automatic engine stop. Thereafter, when a failure of the vehicle speed sensor 21 is detected, the notification unit 24 provides the notification the automatic engine stop will not be performed.

With this configuration, after the notification that the automatic engine stop will be performed, by providing the notification that the automatic engine stop will not be performed, it is possible to more reliably notify the driver that the automatic engine stop will not be performed.

In the present embodiment, the vehicle speed sensor 21 includes the wheel speed sensor 211 that detects a rotation speed of a wheel and the gear rotation sensor 212 that detects the rotation of a gear in a transmission, and when a failure of both the wheel speed sensor 211 and the gear rotation sensor 212 is detected, the automatic engine stop is prohibited.

With this configuration, since a failure of the vehicle speed sensor 21 is detected when both the sensors for detecting the vehicle speed fails, the failure of the vehicle speed sensor 21 can be reliably detected.

Although the embodiment of the present invention has been described above, the above embodiment is merely a part of application examples of the present invention, and is not intended to limit the technical scope of the present invention to the specific configurations of the above embodiment.

In the flowchart of FIG. 2 described above, when the vehicle 1 is determined to enter the parked state after the stopped state, the execution of the automatic engine stop is determined. However, the present invention is not limited thereto. When the vehicle 1 is determined to be in the stopped state, the execution of the automatic engine stop may be determined. And when the stopped state continues for a prescribed time or more, the automatic engine stop may be controlled to be executed.

In the flowchart of FIG. 2 described above, the timer is initialized when the traveling operation device is operated, but the present invention is not limited thereto. When the vehicle 1 continues to be in the stopped state or the parked state, the timer value may be counted up to execute the automatic engine stop regardless of the operation of the traveling operation device.

The vehicle speed sensor 21 of the present embodiment includes the wheel speed sensor 211 and the gear rotation sensor 212, and a failure of the vehicle speed sensor 21 is detected when a failure of both the wheel speed sensor 211 and the gear rotation sensor 212 is detected, but the present invention is not limited thereto. The vehicle speed sensor 21 may include one of the wheel speed sensor 211 and the gear rotation sensor 212.

The invention claimed is:

1. A vehicle control method for controlling a vehicle that travels using a driving force of an engine, the vehicle comprising a vehicle speed detection unit that comprises a wheel speed sensor that detects a rotation speed of a wheel and a gear rotation sensor that detects rotation of a gear in a transmission, the vehicle control method comprising:
   detecting a vehicle speed using the vehicle speed detection unit;
   performing automatic engine stop after a prescribed time elapses from when the vehicle is determined to be in a stopped state based on a detection result of the vehicle speed, and
   prohibiting the automatic engine stop when failures of both the wheel speed sensor and the gear rotation sensor are detected.

2. The vehicle control method according to claim 1, further comprising:
   when the automatic engine stop is prohibited, providing a notification that the automatic engine stop will not be performed to a driver of the vehicle.

3. The vehicle control method according to claim 1, further comprising:
   detecting that the vehicle is in a parked state, wherein;
   when the vehicle enters the parked state after the stopped state, the automatic engine stop is performed after the prescribed time elapses from the detection of the parked state, and
   when the failure of the vehicle speed detection unit is detected, the automatic engine stop is prohibited regardless of whether the vehicle is in the parked state.

4. The vehicle control method according to claim 2, further comprising:

providing the notification that the automatic engine stop will be performed before the elapse of the prescribed time for performing the automatic engine stop; wherein:

when the failure of the vehicle speed detection unit is detected, the notification that the automatic engine stop will not be performed instead of the notification that the automatic engine stop will be performed is provided.

5. The vehicle control method according to claim 2, further comprising:

detecting opening and closing of a driver-side door of the vehicle, wherein:

when the automatic engine stop is prohibited and the driver-side door is detected to be opened, the notification that the automatic engine stop will not be performed is provided.

6. The vehicle control method according to claim 5, wherein:

when the automatic engine stop is prohibited, a notification mode is changed before and after the driver-side door is opened.

7. The vehicle control method according to claim 6, wherein:

when the automatic engine stop is prohibited, a notification level of the notification mode after the driver-side door is opened is higher than a notification level of the notification mode before the driver-side door is opened.

8. The vehicle control method according to claim 2, wherein:

the notification that the automatic engine stop will not be performed is provided by being displayed on a display device which is provided in front of a driver seat of the vehicle.

9. The vehicle control method according to claim 8, wherein:

a notification level of a notification mode that the automatic engine stop will not be performed is higher than a notification level of a notification mode that the automatic engine stop will be performed.

10. The vehicle control method according to claim 2, wherein:

the notification that the automatic engine stop will not be performed is provided by being displayed as a text message on a display device which is provided in front of a driver seat of the vehicle.

11. The vehicle control method according to claim 2, wherein:

when performing the automatic engine stop, the notification that the automatic engine stop will be performed is provided before the elapse of the prescribed time for performing the automatic engine stop, and thereafter, when the failure of the vehicle speed detection unit is detected, the notification that the automatic engine stop will not be performed is provided.

12. A vehicle control device for controlling a vehicle that travels using a driving force of an engine, the vehicle control device comprising:

a vehicle speed detection unit comprising a wheel speed sensor that detects a rotation speed of a wheel and a gear rotation sensor that detects rotation of a gear in a transmission; and an automatic engine stop unit configured to perform automatic engine stop after a prescribed time elapses from when the vehicle is determined to be in a stopped state based on a detection result of the vehicle speed detection unit, wherein;

the automatic engine stop unit prohibits the automatic engine stop when failures of both the wheel speed sensor and the gear rotation sensor are detected.

13. A vehicle control method for controlling a vehicle that travels using a driving force of an engine, the vehicle control method comprising:

detecting a vehicle speed;

performing automatic engine stop after a prescribed time elapses from when the vehicle is determined to be in a stopped state based on a detection result of the vehicle speed;

prohibiting the automatic engine stop when a failure of a vehicle speed detection unit for detecting the vehicle speed is detected;

detecting opening and closing of a driver-side door of the vehicle; and when the automatic engine stop is prohibited and the driver-side door is detected to be opened, providing a notification that the automatic engine stop will not be performed to a driver of the vehicle.

14. The vehicle control method according to claim 13, wherein:

when the automatic engine stop is prohibited, a notification mode is changed before and after the driver-side door is opened.

15. The vehicle control method according to claim 14, wherein:

when the automatic engine stop is prohibited, a notification level of the notification mode after the driver-side door is opened is higher than a notification level of the notification mode before the driver-side door is opened.

* * * * *